United States Patent

[11] 3,620,305

| [72] | Inventor | Richard S. Fulford |
| | | Tulsa, Okla. |
| [21] | Appl. No. | 4,098 |
| [22] | Filed | Jan. 19, 1970 |
| [45] | Patented | Nov. 16, 1971 |
| [73] | Assignee | Cities Service Oil Company |

[54] STIMULATION AND SELECTIVE PLUGGING OF PETROLEUM RESERVOIRS
16 Claims, No Drawings

[52] U.S. Cl. ...................................................... 166/282, 166/307
[51] Int. Cl. ....................................................... E21b 43/27
[50] Field of Search........................................... 166/305, 307, 274, 273, 271, 275, 282, 281; 252/8.55 B, 8.55 D; 106/72

[56] References Cited
UNITED STATES PATENTS

| 2,796,936 | 6/1957 | Sayre, Jr.; et al. | 166/307 |
| 2,935,475 | 5/1960 | Bernard | 166/274 |
| 3,122,204 | 2/1964 | Oakes | 166/307 |
| 3,141,501 | 7/1964 | Bernard et al. | 166/275 X |
| 3,309,211 | 3/1967 | Weiss et al. | 106/72 |
| 3,500,925 | 3/1970 | Beiswanger et al. | 166/305 R |
| 3,508,613 | 4/1970 | Huff et al. | 166/307 |

*Primary Examiner*—Stephen J. Novosad
*Attorney*—J. Richard Geaman

ABSTRACT: Fractures or highly permeable streaks in a reservoir containing kaolinite are selectively plugged by the introduction of a solution containing an organic carbonyl group containing compound. The solution attacks the kaolinite containing particles of the fractures or permeable streaks and decomposes the clay mineral bonds of the rock matrix. The decomposition process causes the walls of the pores to disintegrate and form individual grains of fine clay particles. Subsequent addition of treatment solution transposes the disintegrated particles and lodges them in the exposed pores of the fractures or permeable streaks. Further flow through the treated area is restricted and the reservoir is selectively plugged. Less permeable areas of the reservoir are somewhat stimulated by the kaolinite breakup with the dislodged clay particles from those areas seeking the more permeable channels in the reservoir and further plugging them. The reservoir is thereby both selectively plugged and stimulated by the solution treatment and the reservoir performance is enhanced.

3,620,305

STIMULATION AND SELECTIVE PLUGGING OF PETROLEUM RESERVOIRS

BACKGROUND OF THE INVENTION

This invention relates to the recovery of hydrocarbons from subterranean hydrocarbon-containing reservoirs by varying the permeability therein. More particularly, it relates to the stimulation and selective plugging of kaolinite-containing reservoirs.

In the primary and secondary production of natural gas and petroleum from subterranean reservoirs one often encounters fractures and induced areas of high permeability. By permeability is meant the measure of a reservoir's capacity for transporting fluid through its pores. This capacity is often expressed in petroleum engineering units as darcies or millidarcies. A darcy is that capacity of a reservoir rock necessary to allow the flow of 1 cubic centimeter of 1 centipoise viscosity fluid through 1 centimeter square of rock per second under a pressure gradient of 1 atmosphere per centimeter. Therefore, a given increase in permeability will result in the capability of an equivalent increase in flow through that portion of reservoir rock. Similarly, a decrease in permeability will result in an equivalent decrease in flow capacity in the reservoir rock.

When a reservoir rock is plugged, there exits a decrease in the rock permeability with the flow of reservoir fluids restricted and diverted to other portions of the reservoir matrix. During reservoir stimulation an increase in permeability is established and greater flow of reservoir fluid is afforded through the stimulated areas. The production interval of hydrocarbon-containing reservoir is generally composed of strata of varying permeability. The areas of high permeability may be extremely porous or naturally fractured and thereby permit a high degree of fluid flow. The low-permeability areas, in turn, are formed of tight, less porous material and fluid flow is restricted by the configuration of the rock matrix. Since few rock formations are homogenous, the heterogeneity of the formation must be considered as a restraint in petroleum and natural gas production. It is desirable to treat the less permeable zones of the reservoir by stimulation, thereby affording a greater capacity through which to flow the reservoir fluids ad subjecting a greater volume of reservoir to flooding. Simultaneously, it is desirable to reduce the flow capacity of the more permeable productive cones such that natural production or induced gas or water drives are not generally restricted to these areas of the reservoir.

Previous methods of combating the heterogeneity of reservoirs have involved complex stimulation techniques such as hydraulically fracturing acidizing or detonating the less permeable reservoir zones and packing off or plugging the more permeable reservoir strata. Simultaneous treatment of low- and high-permeability areas is tedious as it is difficult to direct the various treatment fluids to react only with specific formation intervals. The common result is to further restrict the tight zones and increase the permeable zones. The treatments are expensive and often only of short duration with the reservoir eventually returning to its original state. What is required is a reservoir treatment which will both stimulate the less permeable zones and selectively plug the more permeable zones of a reservoir simultaneously.

It is an object of this invention, therefore, to provide for an improved reservoir treatment technique.

It is another object of this invention provide a method for selectively plugging and stimulating the productive zones of a hydrocarbon-containing reservoir.

It is still another object of this invention to provide a one-step reservoir treatment technique which will simultaneously selectively plug the more permeable and stimulate the less permeable reservoir form.

It is a further object of this invention to provide a one-step reservoir treatment technique, which is both economical and uncomplicated, which ill simultaneously selectively plug the more permeable and stimulate the less permeable productive intervals of a hydrocarbon-containing reservoir.

With these and other objects in mind, the invention is hereinafter set forth in the following description.

SUMMARY OF THE INVENTION

A method for treating a well bore and surrounding reservoir of a well containing kaolinite and having extreme permeability heterogeneity is provided comprising introducing a treating fluid, which comprises a solvent with an organic carbonyl-containing compound dissolved there, into said well, through the well bore of said well, and into the surrounding reservoir, whereby said treating fluid simultaneously stimulates the less permeable strata and selectively plugs the more permeable strata and fractures of said well bore and surrounding reservoir.

The treatment solution attacks the kaolinite particles and thereby disintegrates the clay mineral bonds of the rock matrix. This decomposition causes the clay particles to dislodge from the rock matrix. Further movement of fluid past the disintegrated sites removes the dislodged clay particles. As still further fluid is injected into the well bore and reservoir, the dislodged particles become bound within the permeable streaks and fractures, thereby selectively plugging them. The clay particles are washed from the less permeable zones leaves them with a greater permeability than previous to treatment.

The well bore and surrounding reservoir of the well are both simultaneously stimulated and selectively plugged by a one-step treatment affording greater permeability homogeneity throughout the reservoir and allowing greater hydrocarbon recovery. By applying a carbonyl compound of solution of this type the operation is both economical and conducted with great simplification as compared to previous methods of treatment.

DETAILED DESCRIPTION OF THE INVENTION

As indicated, the present invention is a well bore and reservoir treatment which requires no special equipment and application. The treatment solution utilized may be used in conjunction with any kaolinite-containing reservoir formation. In effect, most kaolinite formations are of the sandstone variety and in particular Berea and Bartlesville sandstones are quite susceptible to the treatment solution. For most applications, aldehydes, and urea, which are water soluble and may be employed in conjunction with an aqueous solvent, have been found to be efficient treatment solutions.

In carrying out this method of permeability adjustment the area of the reservoir to be treated by simultaneous stimulation and selective plugging is determined. A predetermined quantity of material to treat this area is injected into the well bore and surrounding reservoir and generally followed by an injection fluid in the case of secondary recovery or reservoir fluid production in the case of primary production, Many diverse application techniques may be used according to the reservoir treatment desired.

The reservoir treatment may be desired at a specific distance from the well bore. The treating solution my be simultaneously injected with the normal injection fluid, for example, water in the case of secondary recovery, or be placed at a given distance from the well bore by the use of a spacing liquid, for example water, liquified petroleum gas (LPG), natural gas, and carbon dioxide, in the case of primary recovery. The volume of spacing liquid or cumulative volume of simultaneous injection fluid plus treating solution to be used to treat the well bore and reservoir surrounding the well may be determined by the equation, $V = \pi r^2 h p s$, where $r$ is the distance from the injection well to be treated, in feet; $h$ is the thickness of the zone being treated, in feet; $p$ is the porosity of the zone being treated, in fraction of total volume; and $s$ is the average water saturation of the zone to be treated, in fraction of pore volume.

The quantity of the treatment solution required is dependent upon the kaolinite content of the formation. The decomposition of the kaolinite appears to be represented by the chemical balance for the hydrolysis of the kaolinite particles by a carbonyl compound such as formaldehyde and may be represented by the reactions:

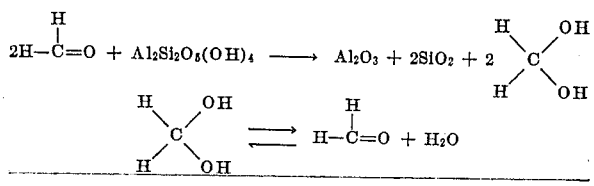

where the first equation represents the hydrolysis hydrolysis of the kaolinite by the carbonyl group and the second equation represents the decomposition of the formalin produced from the hydrolysis. It has been found that the water-soluble aldehydes such as formaldehyde acetaldehyde, propionaldehyde, and n-butyraldehyde have proven especially adaptable for solution makeup and usage with water as the solvent. Other suitable carbonyl compounds include the water-soluble ureides and urea.

It is a preferred embodiment of the invention to use a concentrated solution of the carbonyl compound to provide for the most complete and maximum deterioration of the contacted zones. A concentrated or near-saturated solution of carbonyl compound is preferably when using the spacing technique, so that the treatment solution as it is driven from the well will have a sufficient concentration to contact and decompose the kaolinite particles. When large volumes are to be used it would not be economical to concentrate all the injection fluid as in the simultaneous injection treatment technique. Therefore, the addition of a slug of concentrated treating solution followed by spacing liquid would be acceptable. The preferred spacing liquid to be applied during a secondary recovery project would be the injection fluid used such as water in water flooding, and LPG, natural gas, or carbon dioxide in miscible displacement-type recovery. For primary production, water, natural gas or other suitable, inexpensive spacing media may be applied.

The following example is presented to illustrate the effectiveness of the present invention:

EXAMPLE

Static tests for the determination of carbonyl compounds which will effectively disaggregate rocks were conducted. In the conductance of the static tests, five grams of a selected kaolinite containing rocks were crushed to one-eight to one-quarter inch mesh size. The crushed rock was placed in a 125 milliliter Erlenmeyer flask and 10 milliliters of the carbonyl compound solution was added. The mixture was stopped, shaken and allowed to stand with occasional shaking. The amount of disaggregation was estimated volumetrically after various intervals of time.

The above procedure was conducted using a 48 gram per 10 milliliters of water solution of urea. Within 20 hours the kaolinite rock had been disaggregated by about 25 percent. Repeating the test with formaldehyde in a 40 gram per 100 milliliters of water solution disaggregated half of the kaolinite rock within a 24-hour period.

The results of the example described above indicate that the permeable zones and fractures of the rock were disaggregated into dislodged clay particles so that subsequent flow into the permeable zones would first dislodge clay particles, and then selectively plug them.

The present invention represents a significant advance in the art of well stimulation and selective plugging during the primary and secondary recovery of hydrocarbons. By providing a relatively simple and inexpensive method of treatment, the present invention avoids the heretofore existing complications in combating reservoir permeability heterogeneity. It should be understood and appreciated by those knowledgeable in the art that other embodiments of the present invention exist which are not disclosed herein without departing from the scope of the invention.

Therefore, I claim:

1. A method for treating a well bore and surrounding reservoir of a well containing kaolinite and having and having an undesired condition of extreme permeability heterogeneity comprising:
  a. introducing a treating fluid, which comprises a solvent with a water-soluble aliphatic-carbonyl group containing compound dissolved therein, into said well, through the well bore of said well, and into surrounding formation wherein the treating fluid breaks down the kaolinite structure of the reservoir in which it comes in contact to form a high-permeability zone and aggregate clay particles; and
  b. introducing a spacing liquid into the reservoir through the well bore previously treated to drive the aggregate clay particles formed by the degradation of the kaolinite into the more permeable strata and fractures of the well bore ad surrounding reservoir and thereby selectively plugging these areas while cleansing the less permeable zones of the well bore and reservoir of the aggregate clay particles to raise the permeability therein.

2. The method of claim 1 in which the solvent is water.

3. The method of claim 2 in which said water-soluble aliphatic-carbonyl group containing compound is a water-soluble aldehyde.

4. The method of claim 3 in which the aldehyde is formaldehyde

5 The method of claim 3 in which the aldehyde is acetaldehyde.

6. The method of claim 3 in which the spacing liquid introduced subsequent to the treating fluid is selected from the group consisting of water, brine, LPG, natural gas, and carbon dioxide.

7. The method of claim 2 in which the water-soluble aliphatic-carbonyl group containing compound is urea.

8 The method of claim 2 in which the treating fluid is a water-saturated solution of the water-soluble aliphatic -carbonyl group containing compound.

9. A method for treating a well bore and surrounding reservoir of an injection well containing kaolinite and having an undesired condition of extreme permeability heterogeneity comprising: introducing a treating fluid which comprises a solvent with a water-soluble aliphatic-carbonyl group containing compound dissolved therein, which disintegrates the well bore and surrounding reservoir into aggregate clay particles, into said injection well through the well bore of said injection well; and driving the clay particles into the more permeable zones of the surrounding reservoir by simultaneously introducing said treating fluid with an injection fluid, said treating fluid simultaneously stimulates the less permeable strata and selectively plugs the more permeable strata and fractures of said well and surrounding reservoir and is carried through th e reservoir by the injection fluid.

10. The method of claim 9 in which the solvent is water.

11. The method of claim 10 in which the water-soluble aliphatic-carbonyl group containing compound is a water-soluble aldehyde.

12. The method of claim 11 in which the water-soluble aldehyde is formaldehyde.

13. The method of claim 11 in which the water-soluble aldehyde is an acetaldehyde.

14. The method of claim 10 in which the the water-soluble aliphatic-carbonyl group containing compound 10 urea.

15. The method of claim 10 in which the treating fluids a water-saturated solution of the aliphatic-carbonyl group containing compound.

16 The method of claim 10 which the spacing liquid introduced simultaneously with the treating fluid is selected from the group consisting of water, brine, LPG, natural gas, and carbon dioxide.